US012309656B2

(12) United States Patent
Tripathi

(10) Patent No.: US 12,309,656 B2
(45) Date of Patent: May 20, 2025

(54) SYSTEM METHOD FOR SMART BEAM MANAGEMENT IN 5G

(71) Applicant: RAKUTEN MOBILE, INC., Tokyo (JP)

(72) Inventor: Sandeep Mani Tripathi, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/795,289

(22) PCT Filed: Mar. 30, 2022

(86) PCT No.: PCT/US2022/022510
§ 371 (c)(1),
(2) Date: Jul. 26, 2022

(87) PCT Pub. No.: WO2023/191779
PCT Pub. Date: Oct. 5, 2023

(65) Prior Publication Data
US 2024/0187952 A1    Jun. 6, 2024

(51) Int. Cl.
*H04W 36/08* (2009.01)
(52) U.S. Cl.
CPC .................. *H04W 36/085* (2023.05)
(58) Field of Classification Search
None
See application file for complete search history.

(56) References Cited

U.S. PATENT DOCUMENTS

| 2020/0059967 | A1* | 2/2020 | Kim .................... H04L 1/0026 |
| 2020/0107310 | A1* | 4/2020 | Wang .................... H04B 7/088 |
| 2021/0105751 | A1 | 4/2021 | Xu et al. |
| 2021/0368405 | A1 | 11/2021 | Mishra et al. |

FOREIGN PATENT DOCUMENTS

| WO | 2019/032992 A1 | 2/2019 |
| WO | 2019/047948 A1 | 3/2019 |

OTHER PUBLICATIONS

International Search Report for PCT/US22/22510 dated Jun. 9, 2022.
Written Opinion of International Application PCT/US22/22510 dated Jun. 9, 2022.

* cited by examiner

*Primary Examiner* — Kouroush Mohebbi
(74) *Attorney, Agent, or Firm* — Sughrue Mion, PLLC

(57) ABSTRACT

A method is provided. The method includes receiving, by a new radio (NR) base station (gNB) from a user equipment (UE), an access request on an initial beam of a plurality of beams transmitted by the gNB, the initial beam being determined by the UE as an optimal access request beam, transmitting, by the gNB to the UE, a response to the access request on the initial beam, receiving, by the gNB from the UE, an indication of a first optimal beam to use for data transmission from the gNB to the UE, switching, by the gNB, data transmission from the initial beam to the first optimal beam based on the first optimal beam being different from the initial beam.

17 Claims, 7 Drawing Sheets

SYSTEM METHOD FOR SMART BEAM MANAGEMENT IN 5G

This is a National Stage of International Application No. PCT/US2022/022510 filed Mar. 30, 2022, the contents of all of which are incorporated herein by reference in their entirety.

BACKGROUND

1. Field

The disclosure relates generally to beam selection.

2. Description of Related Art

During 5th generation (5G) non-standalone (NSA) secondary cell group (SCG)-addition and handover procedures, normally a new radio (NR) base station (gNB) waits for a certain user equipment (UE) report to select/determine the best or optimal beam. During this time (i.e., while the gNB is waiting), a suboptimal beam may be utilized based on an internal algorithm of the gNB, which results in lower quality, lower throughput and decreased end user perception.

SUMMARY

According to an aspect of an example embodiment, a method may include receiving, by a new radio (NR) base station (gNB) from a user equipment (UE), an access request on an initial beam of a plurality of beams transmitted by the gNB, the initial beam being determined by the UE as an optimal access request beam, transmitting, by the gNB to the UE, a response to the access request on the initial beam, receiving, by the gNB from the UE, an indication of a first optimal beam to use for data transmission from the gNB to the UE, switching, by the gNB, data transmission from the initial beam to the first optimal beam based on the first optimal beam being different from the initial beam.

According to an aspect of an example embodiment, an NR gNB may include a memory storing instructions and a processor configured to execute the instructions to receive, from a UE, an access request on an initial beam of a plurality of beams transmitted by the gNB, the initial beam being determined by the UE as an optimal access request beam, transmit, to the UE, a response to the access request on the initial beam, receive, from the UE, an indication of a first optimal beam to use for data transmission from the gNB to the UE, and switch data transmission from the initial beam to the first optimal beam based on the first optimal beam being different from the initial beam.

According to an aspect of an example embodiment, a non-transitory computer-readable storage medium may store instructions that, when executed by at least one processor, cause the at least one processor to receive, from a UE, an access request on an initial beam of a plurality of beams transmitted by an NR gNB, the initial beam being determined by the UE as an optimal access request beam, transmit, to the UE, a response to the access request on the initial beam, receive, from the UE, an indication of a first optimal beam to use for data transmission from the gNB to the UE, and switch data transmission from the initial beam to the first optimal beam based on the first optimal beam being different from the initial beam.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

Figure 1:
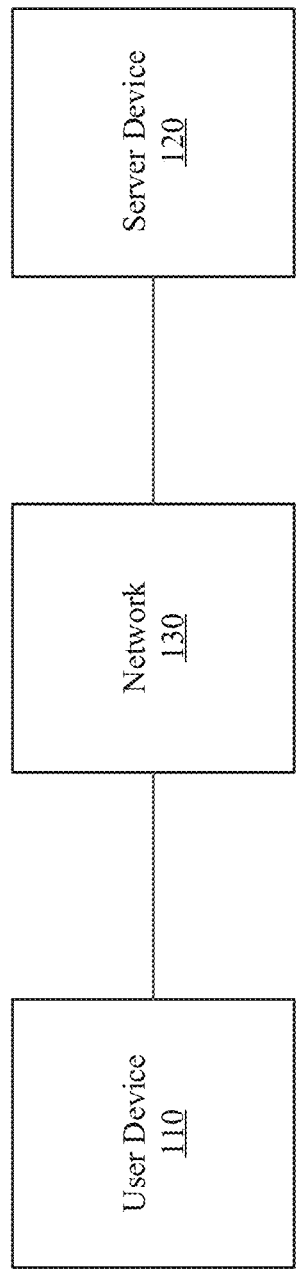
FIG. 1 is a diagram of a system according to an embodiment.

FIG. 1 is a diagram of a system according to an embodiment. FIG. 1 includes a user device 110, a server device 120, and a network 130. The user device 110 and the server device 120 may interconnect via wired connections, wireless connections, or a combination of wired and wireless connections.

The user device 110 may include a computing device (e.g., a desktop computer, a laptop computer, a tablet computer, a handheld computer, a smart speaker, a server device, etc.), a mobile phone (e.g., a smart phone, a radiotelephone, etc.), a camera device, a wearable device (e.g., a pair of smart glasses or a smart watch), or a similar device.

The server device 120 includes one or more devices. For example, the server device 120 may be a server device, a computing device, or the like.

The network 130 includes one or more wired and/or wireless networks. For example, network 130 may include a cellular network (e.g., a fifth generation (5G) network, a Radio Access Network (RAN), an Open-RAN (O-RAN), a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) may perform one or more functions described as being performed by another set of devices.

Figure 2:
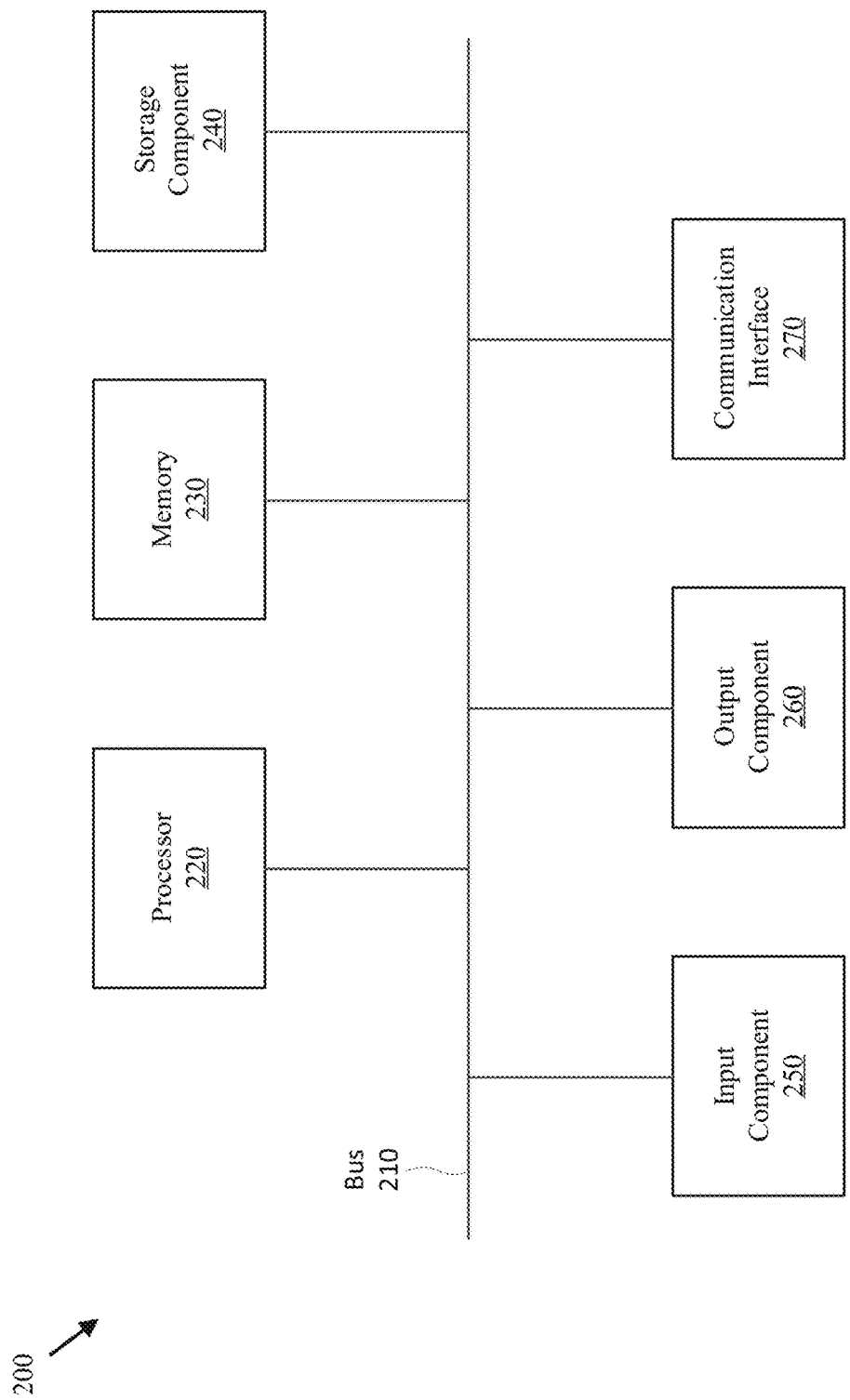
FIG. 2 is a diagram of components of the devices of FIG. 1 according to an embodiment.

FIG. 2 is a diagram of components of one or more devices of FIG. 1 according to an embodiment. Device 200 may correspond to the user device 110 and/or the server device 120.

As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor 220 includes one or more processors capable of being programmed to perform a function.

The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). The input component 250 may include a sensor for sensing information (e.g., a global positioning system (GPS) component, an accelerometer, a gyroscope, and/or an actuator).

The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform operations based on the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or storage component 240 may cause the processor 220 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

Provided are a system, method, and device to select a best known beam for a random access channel (RACH) procedure to enhance system performance and maintain better network quality, as the RACH may provide the latest radio frequency (RF) environment information to the gNB.

Figure 3:
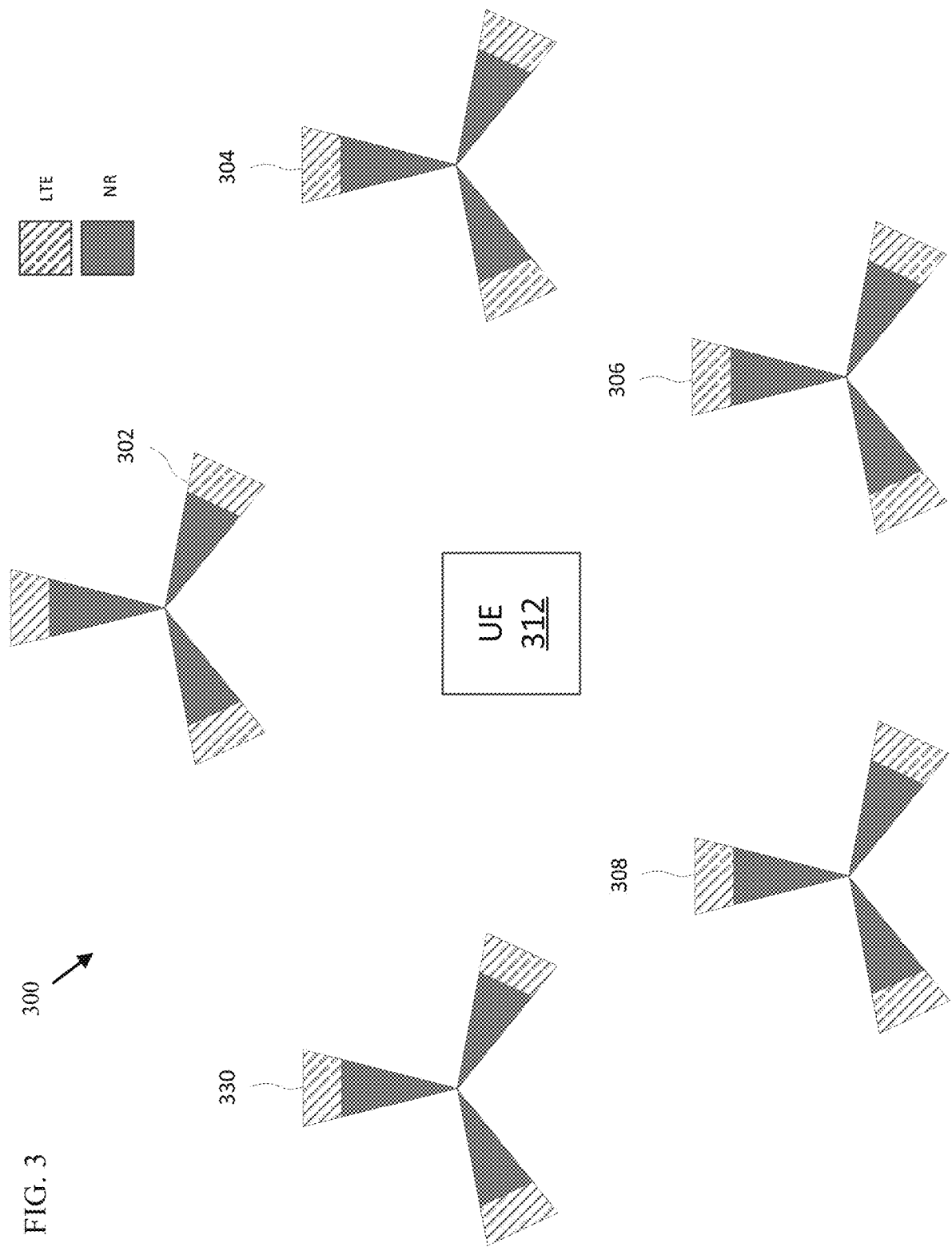
FIG. 3 is a diagram of an overall network environment according to an embodiment.

FIG. 3 is a diagram of an overall network environment according to an embodiment. The network environment 300 may include multiple coverage areas 302-310. Each coverage area may include a long term evolution (LTE) base station (e.g., an eNB) and a new radio (NR) base station (e.g., a gNB). A user equipment (UE) 312 may enter any of the coverage areas 302-310.

Figure 4B:
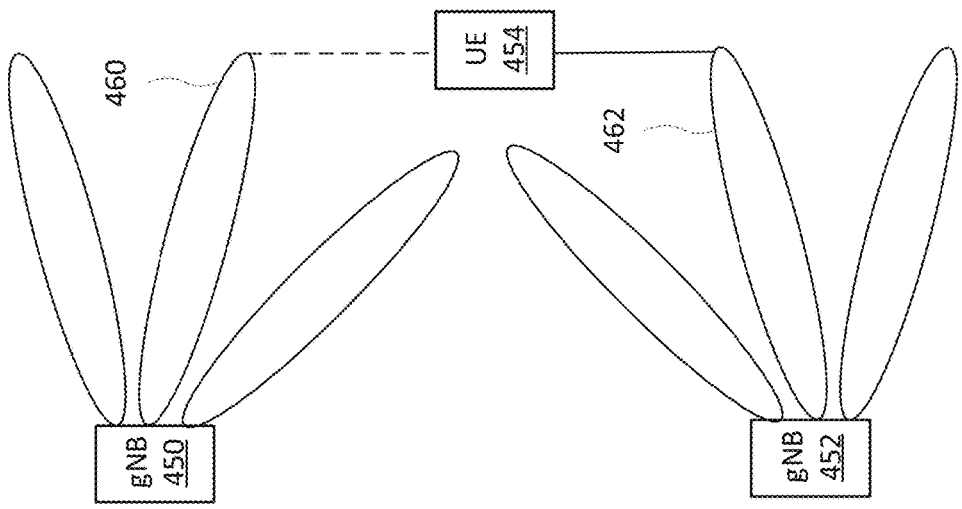
FIG. 4B is a diagram of a network environment according to an embodiment.
Figure 4A:
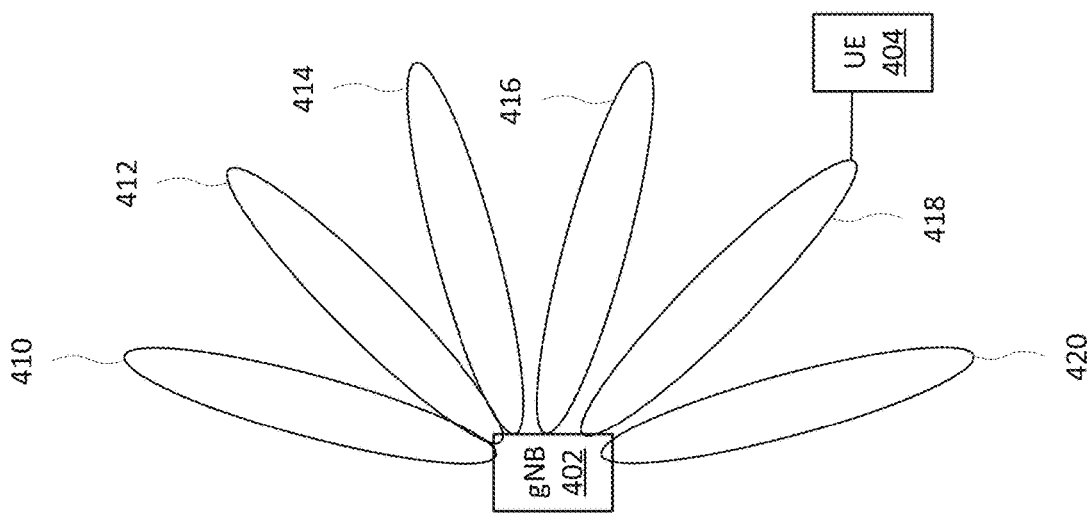
FIG. 4A is a diagram of a network environment according to an embodiment.

FIG. 4A is a diagram of a network environment according to an embodiment. The network environment includes a gNB 402 and a UE 404. The gNB 402 may transmit over a plurality of beams in various directions, such as beam 410, beam 412, beam 414, beam 416, beam 418 and beam 420. Although six beams are depicted, the gNB 402 is not limited to this number of beams as will be understood by one of skill in the art from the description herein. When the UE 404 is in the vicinity of the gNB 402, the UE 404 may transmit an access request (e.g., a random access channel (RACH), a physical RACH (PRACH), etc.) to the gNB 402. The UE 404 may determine an optimal beam from among the plurality of beams to transmit the access request. In the example shown in FIG. 4A, the UE 404 determines that beam 418 is the optimal beam for transmitting the access request.

FIG. 4B is a diagram of a network environment according to an embodiment. The network environment includes a first gNB 450, a second gNB 452 and a UE 454. Each gNB 450 and 452 may include a plurality of beams in various directions. Although a number of beams is depicted, the gNB 450 and gNB 452 are not limited to this number of beams as will be understood by one of skill in the art from the description herein. The UE 454 may be originally connected to the first gNB 450 by beam 460. When UE 454 moves into the vicinity of the second gNB 452, the UE 454 may transmit an access request (e.g., a handover request) to the second gNB 452. The UE 454 may determine an optimal beam from among the plurality of beams of the second gNB 452 to transmit the access request. In the example shown in FIG. 4B, the UE 454 determines that beam 462 is the optimal beam for transmitting the access request.

In both examples shown in FIGS. 4A and 4B, the gNB may receive the access request on the beam that the UE has determined to be optimal for transmitting the access request. After receiving the access request, the gNB may perform data transmission to the UE. The UE may further determine, while the gNB is performing data transmission, an optimal beam for the data transmission. The gNB, instead of performing data transmission on a beam according to a pre-stored algorithm or a predefined setting, the gNB may perform data transmission on the same beam that was determined by the UE to be optimal for the access request transmission. The gNB may then receive a determination of an optimal beam or optimal beams from the UE for performing data transmission. When the optimal beam for performing data transmission is different from the optimal beam for transmitting the access request, the gNB may switch data transmission to the optimal beam for performing data transmission as determined by the UE.

Figure 5:
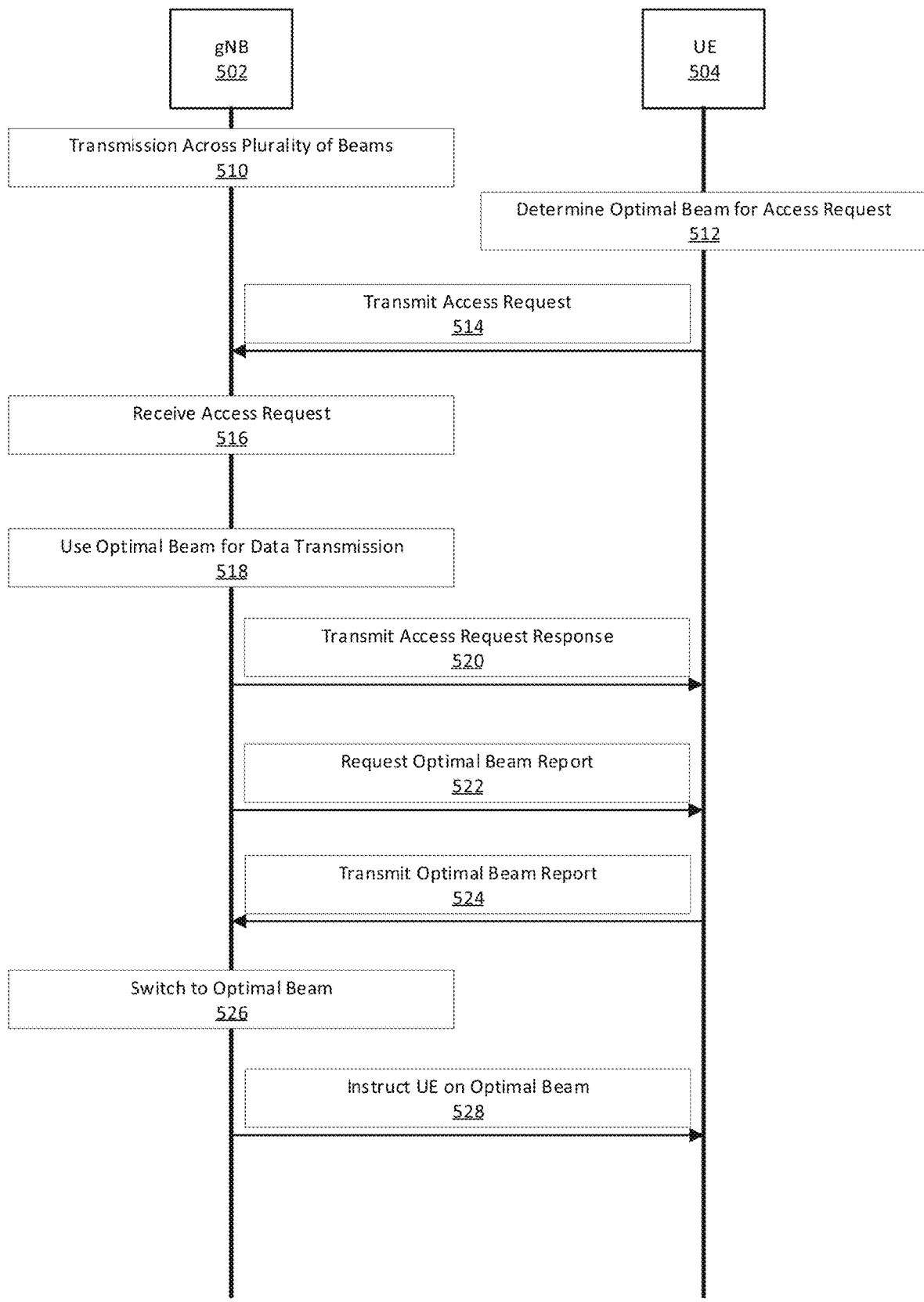
FIG. 5 is a flowchart of operations for beam selection according to an embodiment.

FIG. 5 is a flowchart of operations for beam selection according to an embodiment. The operations may be performed by a gNB 502 and a UE 504. In operation 510, the gNB 502 performs transmission across a plurality of beams. In operation 512, the UE 504 determines an optimal beam for transmitting an access request (e.g., a RACH request, a PRACH request, a handover request, etc.). In operation 514, the UE 504 transmits to the gNB 502 the access request on the optimal beam for transmitting the access request. In operation 516, the gNB 502 receives the access request on the optimal beam for transmitting the access request.

In operation 518, the gNB 502 uses the optimal beam for transmitting the access request for data transmission to the UE 504. In operation 520, the gNB 502 sends an access request response to the UE 504. In operation 522, the gNB 502 requests an optimal beam report (e.g., an indication of an optimal beam) from the UE 504. In operation 524, the UE 504 transmits to the gNB 502 the optimal beam report including an indication of the optimal beam or beams for data transmission. In operation 526, the gNB 502 switches data transmission to the optimal beam as determined by the UE 504 based on the optimal beam for data transmission being different from the optimal beam for transmitting the access request. In operation 528, the gNB 502 instructs the UE 504 on the optimal beam.

During operations 518 to 526, the gNB 502 may perform data transmission with the UE 504. Instead of performing data transmission on a predetermined beam or beam determined by a predefined algorithm on the gNB 502, the gNB 502 may perform data transmission on the beam determined by the UE to be optimal for transmitting the access request. This results in higher quality, better throughput and increased end user perception.

Figure 6:
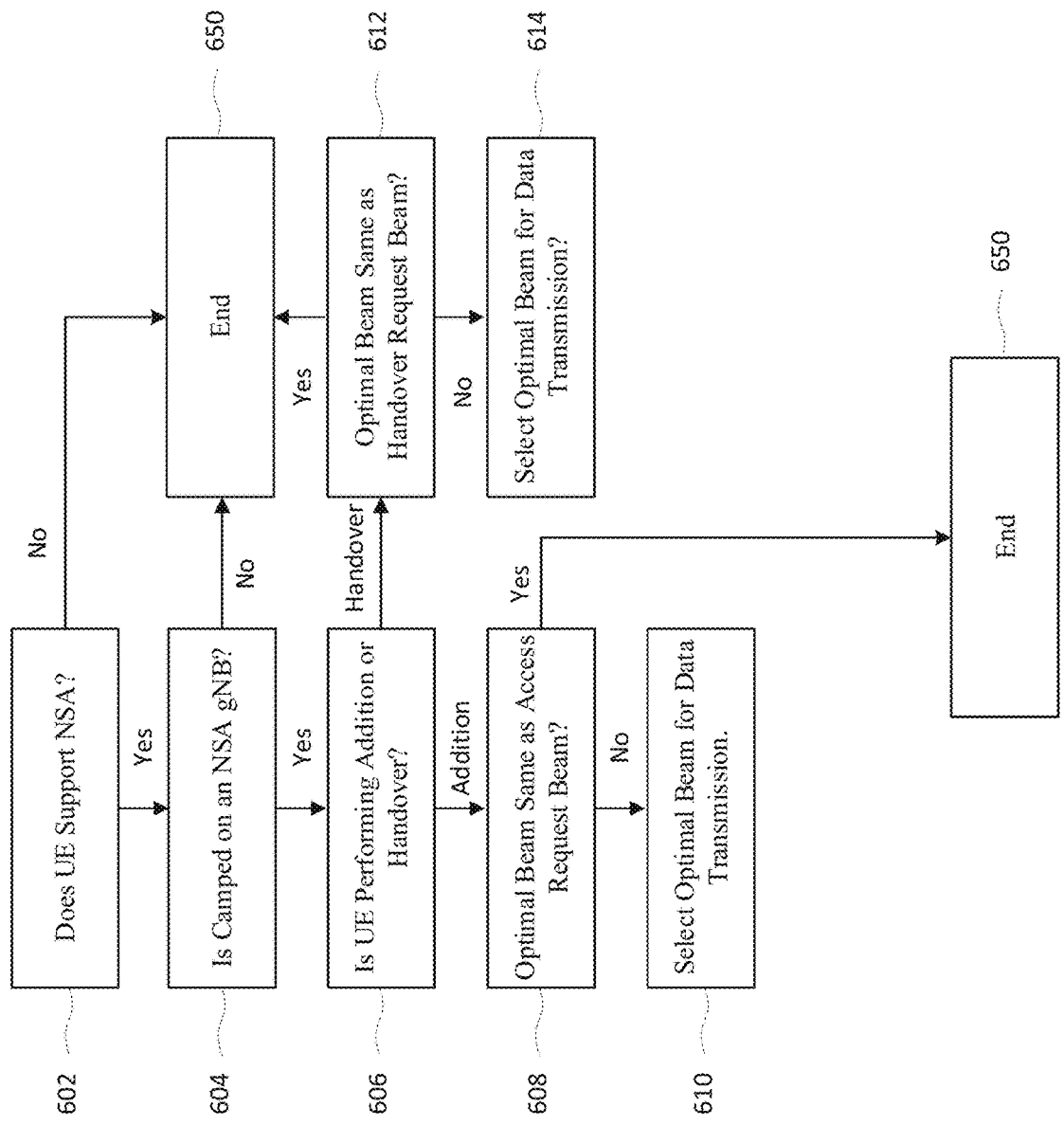
FIG. 6 is a flowchart of a beam selection method according to an embodiment.

FIG. 6 is a flowchart of a beam selection method according to an embodiment. In operation 602, the system determine whether the UE supports non-standalone (NSA) operation. If the UE does not support NSA operation, the method stops at operation 650. In operation 604, if the UE supports NSA operation, the system determine whether the UE is camped on an NSA gNB. If the UE is not camped on NSA, the method stops at operation 650. If the UE is camped on an NSA gNB, in operation 606, the system determines whether the UE is performing addition (e.g., a RACH or PRACH access request) or performing a handover. If the UE is performing addition, then in operation 608, the system determines whether the optimal beam for data transmission determined by the UE is the same as the beam used for transmitting the RACH or PRACH access request. If the optimal beam for data transmission is the same as the beam used for transmitting the access request, then the method stops at operation 650, as the gNB is performing data transmission on the beam that the gNB received the access request. If the optimal beam for data transmission is different from the beam used for transmitting the access request, then, in operation 610, the system selects the optimal beam for data transmission and instructs the UE to use the optimal beam for data transmission.

If the UE is performing a handover, then in operation 612, the system determines whether the optimal beam for data transmission determined by the UE is the same as the beam used for transmitting the handover request. If the optimal beam for data transmission is the same as the beam used for transmitting the handover request, then the method stops at operation 650, as the gNB is performing data transmission on the beam that the gNB received the handover request. If the optimal beam for data transmission is different from the beam used for transmitting the handover request, then, in operation 614, the system selects the optimal beam for data transmission and instructs the UE to use the optimal beam for data transmission.

In an example embodiment, the UE in the network environment may change locations. When this occurs or at predetermined periodic intervals, the UE may determine a new optimal beam to use for data transmission. The UE may send a report to the gNB (i.e., the report may be sent at the request of the gNB, as a predetermined time interval set by the UE, etc.) the determined new optimal beam to use for data transmission, and the gNB may switch to the newly determined optimal beam for data transmission.

Figure 7:
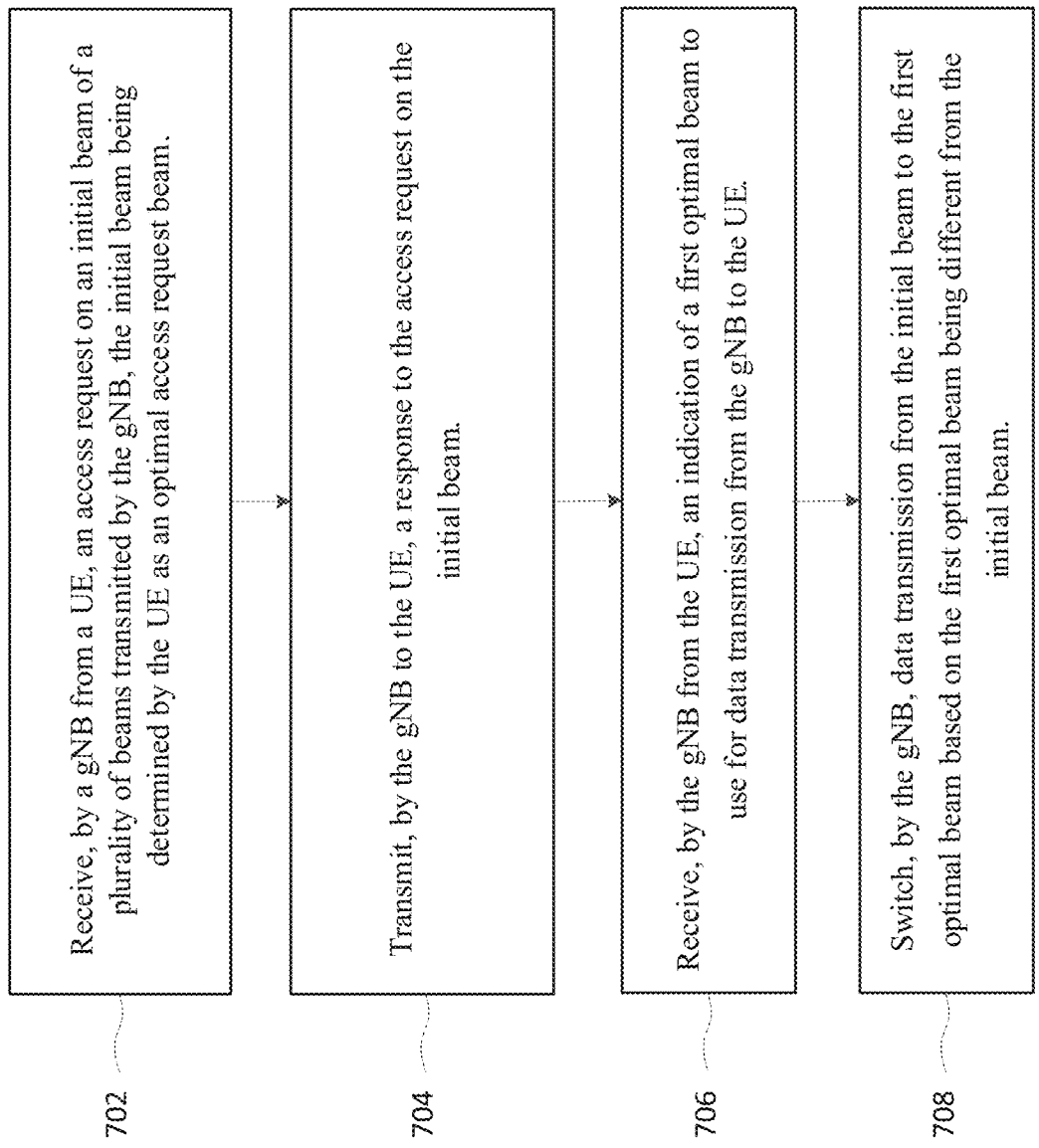
FIG. 7 is a flowchart of a method for beam selection according to an embodiment.

FIG. 7 is a flowchart of a method for beam selection according to an embodiment. In operation 702, the system receives, by a gNB from a UE, an access request on an initial beam of a plurality of beams transmitted by the gNB, the initial beam being determined by the UE as an optimal access request beam. In operation 704, the system transmits, by the gNB to the UE, a response to the access request on the initial beam. In operation 706, the system receives, by the gNB from the UE, an indication of a first optimal beam to use for data transmission from the gNB to the UE. In operation 708, the system switches, by the gNB, data transmission from the initial beam to the first optimal beam based on the first optimal beam being different from the initial beam.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving, by a new radio (NR) base station (gNB) from a user equipment (UE), an access request on an initial beam of a plurality of beams transmitted by the gNB, the initial beam being determined by the UE as an optimal access request beam;
transmitting, by the gNB to the UE, a response to the access request on the initial beam based on the gNB identifying the initial beam as being used to receive the access request;
determining, by the gNB, whether an indication of a first optimal beam to use for data transmission from the gNB to the UE has been received;
in response to determining that the indication has not been received, transmitting, by the gNB to the UE, data on the initial beam;
receiving, by the gNB from the UE after transmitting the data on the initial beam, the indication of the first optimal beam to use for data transmission from the gNB to the UE; and
switching, by the gNB, transmission of the data from the initial beam to the first optimal beam based on the first optimal beam being different from the initial beam.

2. The method of claim 1, wherein the access request comprises a random access channel (RACH).

3. The method of claim 2, wherein the first optimal beam is from among the plurality of beams transmitted by the gNB.

4. The method of claim 1, wherein the access request comprises a handover request.

5. The method of claim 4, wherein the first optimal beam is from among another plurality of beams transmitted by another gNB.

6. The method of claim 1, further comprising:
receiving, by the gNB from the UE, an updated indication of a second optimal beam for data transmission from the gNB to the UE; and
switching, by the gNB, data transmission from the first optimal beam to the second optimal beam based on the second optimal beam being different from the first optimal beam.

7. A new radio (NR) base station (gNB), comprising:
a memory storing instructions; and
a processor configured to execute the instructions to:
receive, from a user equipment (UE), an access request on an initial beam of a plurality of beams transmitted by the gNB, the initial beam being determined by the UE as an optimal access request beam;
transmit, to the UE, a response to the access request on the initial beam based on the gNB identifying the initial beam as being used to receive the access request;
determine whether an indication of a first optimal beam to use for data transmission from the gNB to the UE has been received;
in response to determining that the indication has not been received, transmit, to the UE, data on the initial beam;
receive, from the UE after transmitting the data on the initial beam, the indication of the first optimal beam to use for data transmission from the gNB to the UE; and
switch transmission of the data from the initial beam to the first optimal beam based on the first optimal beam being different from the initial beam.

8. The NR gNB of claim 7, wherein the access request comprises a random access channel (RACH).

9. The NR gNB of claim 8, wherein the first optimal beam is from among the plurality of beams transmitted by the gNB.

10. The NR gNB of claim 7, wherein the access request comprises a handover request.

11. The NR gNB of claim 10, wherein the first optimal beam is from among another plurality of beams transmitted by another gNB.

12. The NR gNB of claim 7, wherein the processor is further configured to execute the instructions to:
receive, from the UE, an updated indication of a second optimal beam for data transmission from the gNB to the UE; and
switch data transmission from the first optimal beam to the second optimal beam based on the second optimal beam being different from the first optimal beam.

13. A non-transitory computer-readable storage medium storing instructions that, when executed by at least one processor, cause the at least one processor to:
receive, from a user equipment (UE), an access request on an initial beam of a plurality of beams transmitted by a new radio (NR) base station (gNB), the initial beam being determined by the UE as an optimal access request beam;
transmit, to the UE, a response to the access request on the initial beam based on the gNB identifying the initial beam as being used to receive the access request;
determine whether an indication of a first optimal beam to use for data transmission from the gNB to the UE has been received;
in response to determining that the indication has not been received, transmit, to the UE, data on the initial beam;
receive, from the UE after transmitting the data on the initial beam, the indication of thea first optimal beam to use for data transmission from the gNB to the UE; and
switch transmission of the data from the initial beam to the first optimal beam based on the first optimal beam being different from the initial beam.

14. The storage medium of claim 13, wherein the access request comprises a random access channel (RACH).

15. The NR gNB of claim 14, wherein the first optimal beam is from among the plurality of beams transmitted by the gNB.

16. The storage medium of claim 13, wherein the access request comprises a handover request.

17. The storage medium of claim 16, wherein the first optimal beam is from among another plurality of beams transmitted by another gNB.

* * * * *